A. EK.
FLEXIBLE PLANK.
APPLICATION FILED JUNE 24, 1911.
1,004,861.
Patented Oct. 3, 1911.
2 SHEETS—SHEET 2.
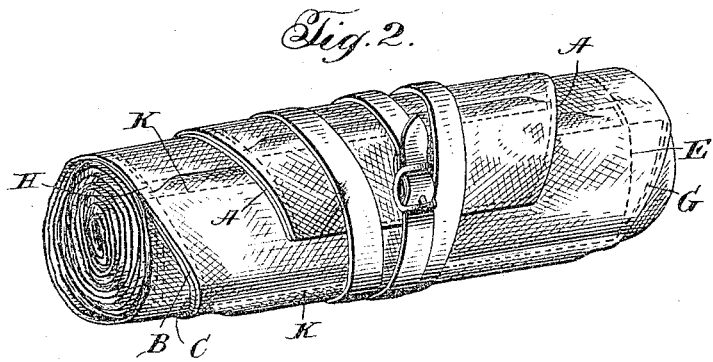
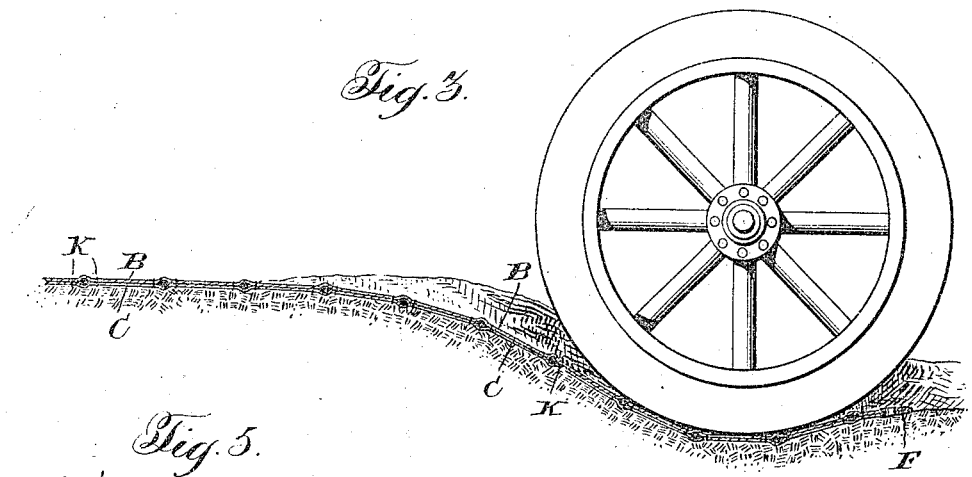
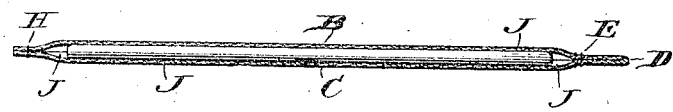
Witnesses:
Jas. E. Hutchinson
C. A. Krey
Inventor:
Arvid Ek,
By his Attorneys

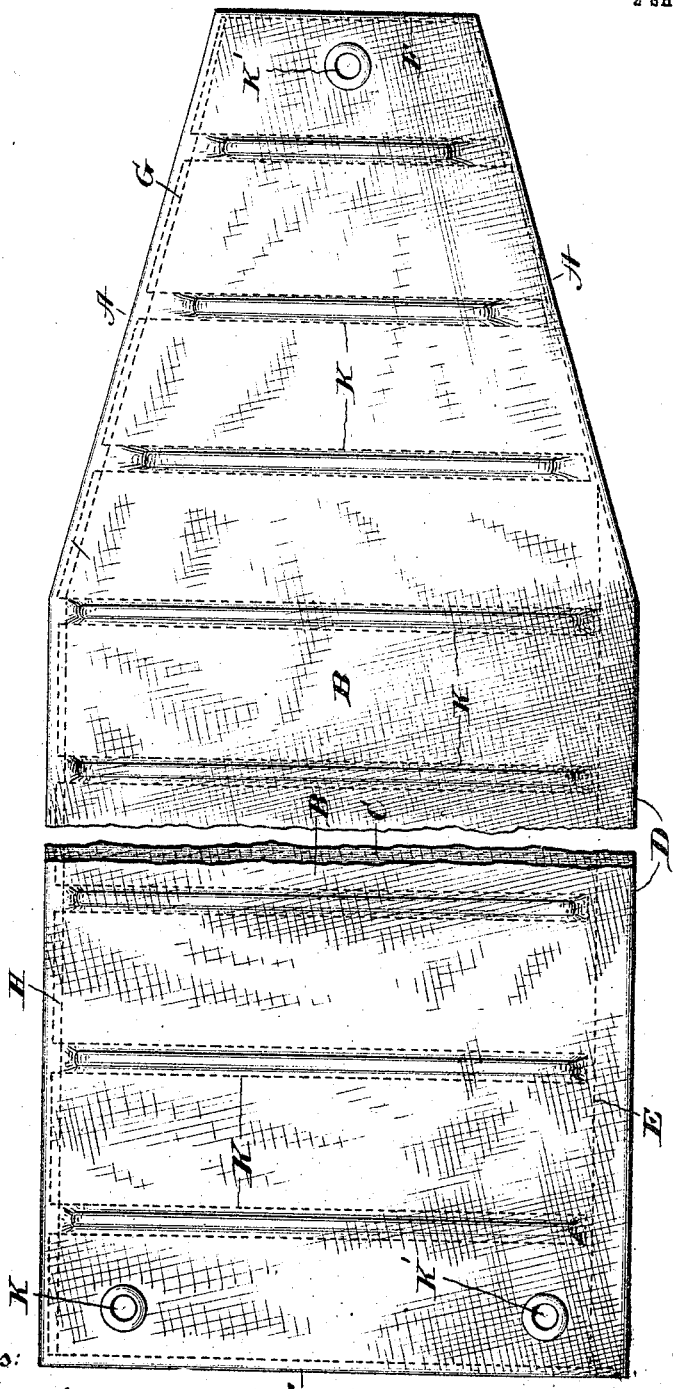

UNITED STATES PATENT OFFICE.

ARVID EK, OF PORTLAND, MAINE.

FLEXIBLE PLANK.

1,004,861.   Specification of Letters Patent.   Patented Oct. 3, 1911.

Application filed June 24, 1911. Serial No. 635,234.

*To all whom it may concern:*

Be it known that I, ARVID EK, a citizen of the United States, residing at Portland, in the county of Cumberland and State of Maine, have invented certain new and useful Improvements in Flexible Planks, of which the following is a specification, reference being had therein to the accompanying drawing.
This invention relates to planks and traction devices adapted to constitute a part of motor vehicle equipment, and has for its object the provision of a flexible plank designed to assist a motor vehicle, operating under its own power, to climb out of or escape from snow, mire, sand, gullies or ditches, in which the same may have become stalled.

The characteristic features of the invention embrace a plank of a character capable of conforming to the contour of the surface to which it is to be applied, sufficient in strength to support the vehicle at the point of application, affording an abundant traction surface for engagement of the tire of the vehicle wheel, and the capability of the device to be rolled or folded into compact and neat form for storage in the tool box, under the seat, or elsewhere, in the body of the vehicle.

The invention is capable of embodiment in many forms, as will appeal to those skilled in the art, each possessing any or all of the foregoing desirable characteristics, but for the sake of imparting a full understanding of the invention, it is necessary to illustrate herein simply the preferred embodiment of the invention, the latter being shown in the accompanying drawings forming part hereof.

The details in the construction and arrangement of parts of the device will be apparent from the specific description hereinafter contained, when read in connection with said drawings.

In the drawings, Figure 1 is a plan view of the plank, Fig. 2 is a perspective view showing the same in rolled condition for storage or shipment, Fig. 3 is a longitudinal sectional view through the plank showing one end thereof lowered into a depression and tucked beneath an automobile wheel, Fig. 4 is a transverse section, and Fig. 5 is a longitudinal section.
Referring more specifically to the drawings, wherein like reference characters designate corresponding parts in the several views, it will be seen from Figs. 1 and 3 that in general shape, the plank is oblong of substantial length, preferably several feet longer than the wheel base of the vehicle, and of a width to afford ample traction surface, preferably approximately fourteen inches, although the matter of length and width may be varied at will, and to suit the conditions surrounding the desired use of the plank or set of planks, it being intended that four planks, one for each wheel, shall constitute the usual equipment.
Near one end of the plank,—that end which may be properly termed the inner end, or the end to be applied immediately adjoining the wheel,—the plank is tapered, as shown at A.

The body of the plank is flexible longitudinally throughout, the same being composed of several thicknesses, conveniently two, of a tough strong canvas, especially adapted for the service to which it is to be put. The layers of canvas to which I have alluded are represented at B and C, preferably constituted by folding over a single sheet of canvas as at D, and stitched together by a line of stitching E. The outer ends of the folds are turned in and stitched together as at F, and the tapered inner portion at its sides and end inclosed by a similar stitching G, the open side of the body being also closed by a line of stitching H.

At suitable distances apart throughout the length of the body, I form pockets J between the layers B and C extending transversely thereof, by stitching the layers together back and forth throughout the length of the plank, as represented at K. Within the pockets referred to, steel rods are inserted and confined in place by the marginal stitchings, said rods being of ample strength to support the vehicle, the rods being preliminarily tested to a point far beyond such required strength. As shown in Fig. 4, the rods are substantially shorter in length than the length of the pockets, so that although the rods are permanently secured in place, the ends thereof are sufficiently removed from the marginal stitches to relieve such stitching of any tendency to give way or tear, such as might exist were the ends of the rods brought up to and the material expanded up and down immediately adjoining the stitching. A further re sult attained by having the rods shorter than the pockets is that the free marginal portions of the plank may bend upwardly into somewhat trough-like formation.

The top and bottom walls of the pockets and the rods, by reason of the size of the rods, project upwardly and downwardly beyond the surfaces of the intermediate portions of the canvas body, thereby constituting on the bottom of the plank ribs adapted to embed in the earth or the like, to prevent the plank from slipping, and on the top presenting similar ribs adapted to be engaged by the rubber tire to assist somewhat after the fashion of a ladder, in causing the wheel to climb up and over the traction surface, thus afforded by the plank. In this connection it is to be noted that by reason of the character of the material employed (canvas or the like) a good traction surface is also afforded.

In use, the tapered end of the plank is inserted in the rut or depression in which the vehicle is stalled, beneath the wheel so as to be engaged by the rubber tire of the latter, and the flexible nature of the plank conforming to the contour of the surface on which it rests, and the steel bars and canvas body being ample to support the weight imposed thereon, it will be appreciated that the wheel under the motive power of the vehicle itself, may readily climb out of or pass over the objectionable place or places. Of course, the plank may also be used as a precautionary device in placing the same over any treacherous place in a road to prevent the vehicle from being stalled in the first instance.

While ordinarily the grip of the ribbed body in the earth etc. will prevent displacement of the plank, at times, as in extremely slippery or loose mud, or in the case of sand, it may be found desirable to secure the plank against creeping or slippage, and to that end the same is provided at opposite ends of the plank with gromets or holes K', permitting the plank to be pegged in place or tied through the medium of rope.

From the foregoing, it will be appreciated that by a simple, inexpensive means, I provide a device of a strong durable construction, and fully capable of performing the functions attributed thereto.

I claim:

1. A plank for vehicle wheels comprising a detached flexible elongated member composed of cross rods and connections between the same of a width greater than the tread of a wheel tire.

2. A device of the character described comprising a detached elongated body portion flexible lengthwise thereof adapted at one end to be bent into a depression beneath a wheel tire, substantially as described.

3. A device of the character described comprising a detached elongated body portion flexible lengthwise thereof adapted at one end to be bent into a depression beneath a wheel tire, and a plurality of supporting members arranged transversely of the plank, substantially as described.

4. A device of the character described comprising a detached elongated body portion flexible lengthwise thereof adapted at one end to be bent into a depression beneath a wheel tire, and a plurality of supporting rods arranged transversely of the plank projecting outwardly from the surface thereof.

5. A plank of the character described flexible throughout its length and provided also throughout said length with holding projections on its under face.

6. A detached plank of the character described flexible throughout its length and provided also throughout said length with traction projections on its upper surface adapted to engage a wheel tire.

7. A plank of the character described flexible lengthwise thereof and provided with holding projections on its under surface, said projections being embedded in the flexible body of the plank.

8. A detached plank of the character described flexible lengthwise thereof provided with traction projections on its upper surface adapted to engage a wheel tire, said projections being embedded in the flexible body of the plank.

9. A plank of the character described flexible lengthwise thereof and provided with holding projections on its under surface, said projections being embedded in the flexible body of the plank, and consisting of separated rods disposed transversely of the body.

10. A detached plank of the character described flexible lengthwise thereof provided with traction projections on its upper surface adapted to engage a wheel tire, said projections being embedded in the flexible body of the plank, and consisting of separated rods disposed transversely of the body.

11. A plank of the character described flexible lengthwise thereof provided with projecting ribs on its top and bottom constituted by rods arranged approximately transversely of the flexible body.

12. A plank of the character described flexible lengthwise thereof provided with projecting ribs on its top and bottom constituted by rods arranged approximately transversely of the flexible body, and embedded therein.

13. A plank of the character described comprising an elongated body flexible lengthwise thereof adapted to be inserted at one end beneath a wheel tire and means associated with said body for preventing the bending thereof laterally.

14. A plank of the character described comprising an elongated body flexible lengthwise thereof adapted to be inserted at one end beneath a wheel tire, means associated with said body for supporting a wheel, and means at the opposite ends of the body for fastening the same in place.

15. A plank of the character described comprising an elongated body formed of layers of strong flexible material and provided with a plurality of pockets, and rods inserted in said pockets strengthening the body transversely while permitting the same to flex lengthwise.

16. A plank of the character described comprising an elongated body formed of layers of strong flexible material and provided with a plurality of pockets, and rods inserted in said pockets strengthening the body transversely while permitting the same to flex lengthwise, the rods being of substantially less length than the pockets, substantially as described.

17. A plank of the character described comprising an elongated body formed of layers of strong flexible material and provided with a plurality of pockets, and rods inserted in said pockets strengthening the body transversely while permitting the same to flex lengthwise, the inner end of the plank being narrowed in width relative to the remaining portion of the body and the rods at said end being correspondingly shortened.

18. A plank of the character described comprising an elongated body formed of layers of strong flexible material and provided with a plurality of pockets, and rods inserted in said pockets strengthening the body transversely while permitting the same to flex lengthwise, the rods being of substantially less length than the pockets, the inner end of the plank being narrowed in width relative to the remaining portion of the body and the rods at said end being correspondingly shortened, substantially as described.

In testimony whereof I affix my signature in presence of two witnesses.

ARVID EK.

Witnesses:
KENNETH E. TURTCHELL,
R. E. BROWN, Jr.